April 21, 1959   B. E. CURRAN ET AL   2,883,111
DAMPER CONTROL APPARATUS FOR DUAL DUCT AIR CONDITIONING SYSTEM
Filed Nov. 21, 1956   5 Sheets-Sheet 2

INVENTORS
Bernard E. Curran
Glenn E. Kautz
BY Robert P. Churchill
ATTORNEY

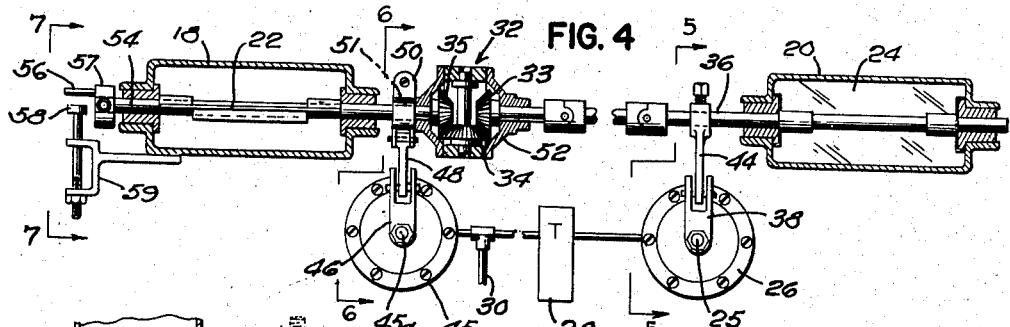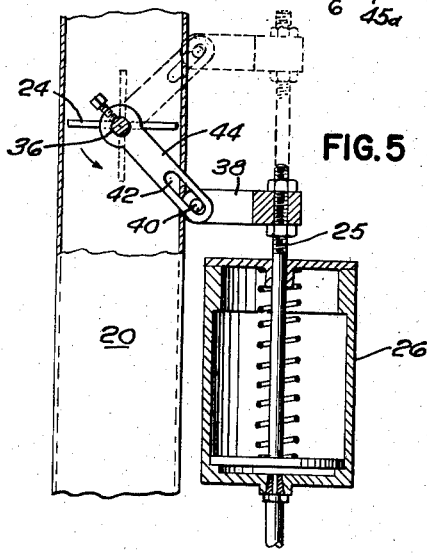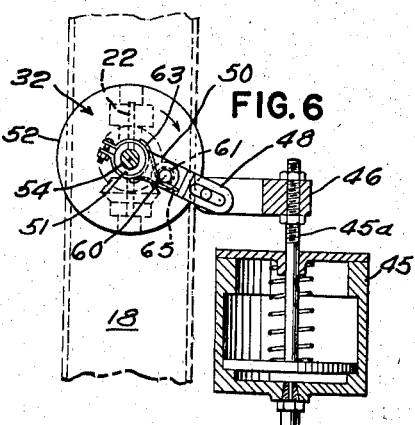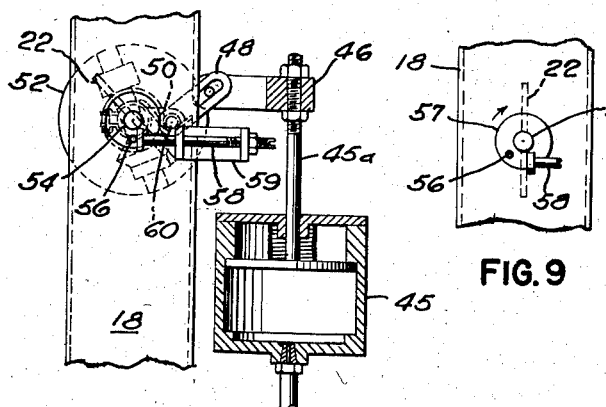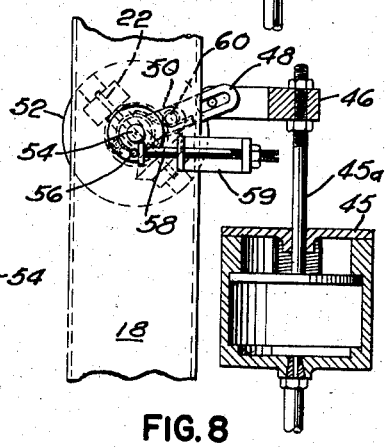

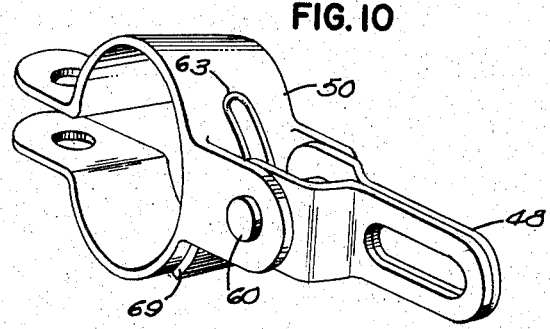
FIG. 10
FIG. 11
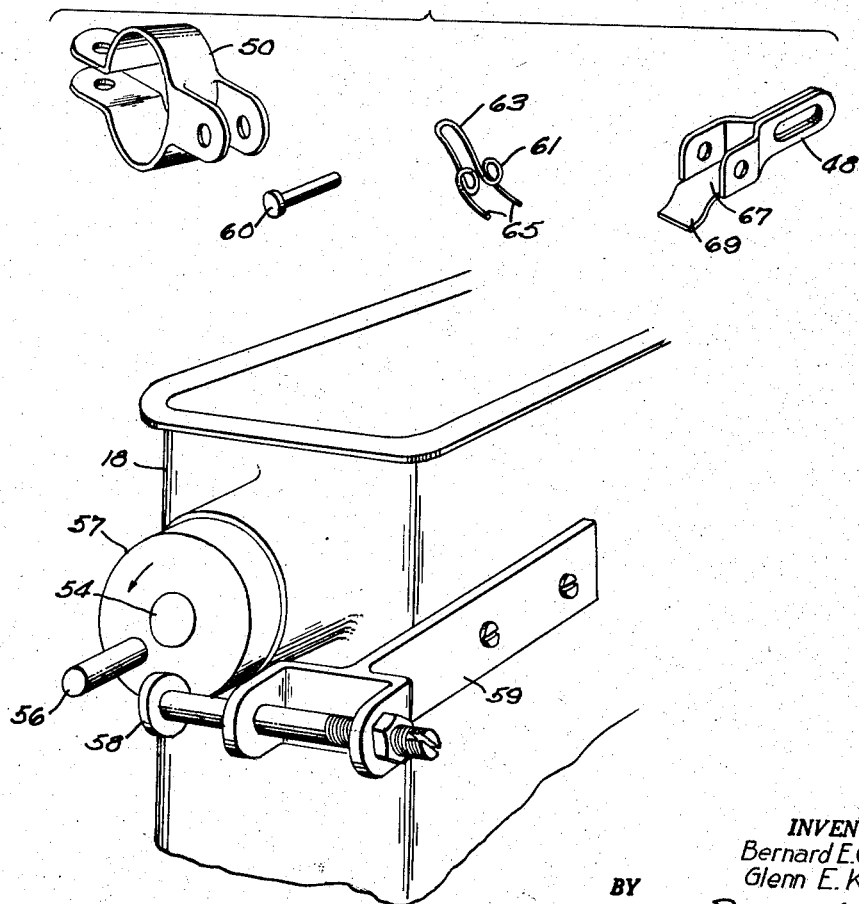
FIG. 12
INVENTORS
Bernard E. Curran
Glenn E. Kautz
BY Robert R. Churchill
ATTORNEY _United States Patent Office_

2,883,111
Patented Apr. 21, 1959

2,883,111

DAMPER CONTROL APPARATUS FOR DUAL DUCT AIR CONDITIONING SYSTEM

Bernard E. Curran and Glenn E. Kautz, Sewickley, Pa., assignors to H. H. Robertson Company, Pittsburgh, Pa., a corporation of Pennsylvania Application November 21, 1956, Serial No. 623,614

9 Claims. (Cl. 236—1)

This invention relates to novel damper control apparatus for a dual duct air conditioning system.

The invention has for an object to provide novel and efficient apparatus for controlling the two modulating volume control dampers used in controlling the air flow from each pair of dual ducts into a single outlet box from which the air is discharged into the building to the end that the pair of ducts may be used for supplying hot and cold air for winter operation and also to permit both ducts to be used for supplying cool air during the summer or cooling season.

A further object of the invention is to provide novel apparatus of the character described which may be used with advantage in the air conditioning system forming the subject matter of the Goemann, Patent No. 2,729,429, dated January 3, 1956.

With these general objects in view and such others as may hereinafter appear the invention consists in the damper control mechanism hereinafter described and particularly defined in the claims at the end of this specification.

In the drawings illustrating the preferred embodiment of the invention:

Fig. 4 is a cross sectional plan view of the damper control apparatus shown in Fig. 3;

Fig. 5 is a side elevation partly in cross section as seen from the line 5—5 of Fig. 4;

Fig. 6 is a similar view as seen from the line 6—6 of Fig. 4;

Fig. 7 is a view similar to Fig. 6 showing the control apparatus in a different position of operation and as seen from the line 7—7 of Fig. 4;

Fig. 8 is a view similar to Fig. 7 showing the apparatus in still another position of operation;

Fig. 9 is a detail view in side elevation of damper stop mechanism to be referred to;

Fig. 10 is a perspective view of a resilient arm forming a part of the present control apparatus;

Fig. 11 is a perspective view of the parts shown in Fig. 10 disassambled;

Fig. 12 is a perspective view of the damper stop mechanism to be referred to.

The present invention contemplates novel damper control mechanism for controlling the movements of and relationship of each pair of dampers employed in controlling the supply of hot and cold air to a discharge outlet in a dual duct air conditioning system and particularly in an air conditioning system of the type forming the subject matter of the Goemann patent above referred to. The novel control mechanism enables the convenient conversion of each pair of the ducts serving the outlets from winter operation wherein hot and cold air flow through the different ducts of each pair to summer operation wherein both ducts carry cool air.

The invention will be described in connection with the preferred system as embodied in the structure shown generally in the Goemann patent above referred to.

Figure 1:
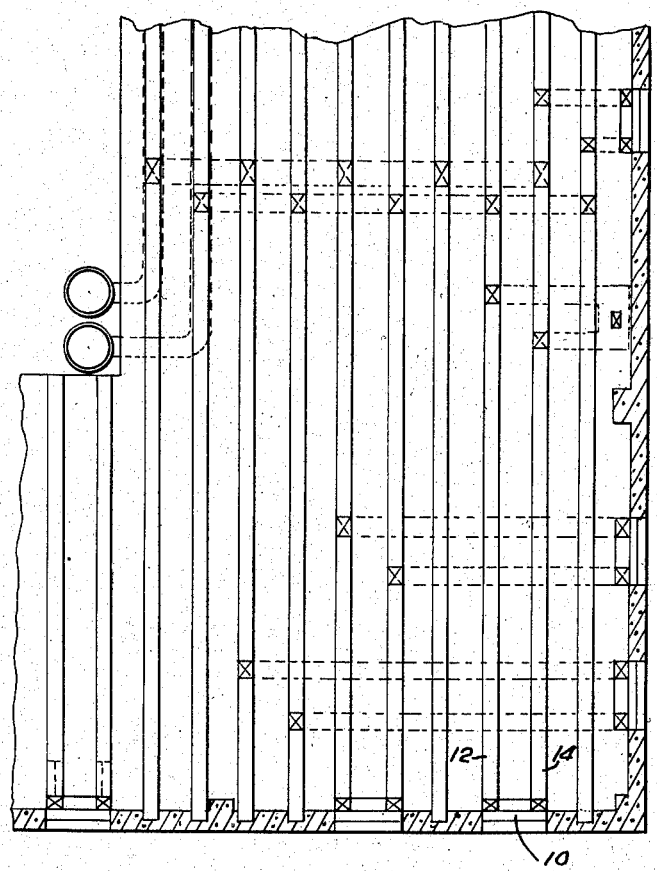
Fig. 1 is a diagrammatic plan view of a portion of a building embodying an air conditioning system provided with sill or outlet boxes in which the present damper control apparatus may be used.

Referring now to the drawings, the present damper control mechanism is an improvement upon the damper control mechanism illustrated in Figs. 17, 18 and 21 of the Goemann patent above referred to, wherein the air distributing outlets 10 are in communication with hot and cold air conducting cells 12, 14 forming a part of the flooring structure as indicated in Fig. 1. The sill box 10 is provided with a mixing chamber 16 having a pair of stacks 18, 20 connected to the hot and cold air ducts 12, 14 respectively, and each stack is provided with a damper 22, 24 respectively arranged at right angles to each other for the winter heating season. The dampers are arranged to be rotated by connections to an air cylinder 26 actuated by a thermostat 28 which is connected in a compressed air supply line 30, the thermostat acting as a valve to increase or decrease the air pressure from line 30 upon an increase or decrease in the room temperature. As thus arranged, an increase in room temperature will effect opening of the cold air damper 24 and closing of the hot air damper 22, and a decrease in room temperature will effect closing of the cold air damper and opening of the hot air damper whereby to modulate the hot and cold air dampers against each other during the winter heating cycle.

For summer cooling operation wherein both air conducting cells 12, 14 cary cold air it is preferred to change the position of the dampers from a position at right angles to each other to a position parallel to each other so as to effect a simultaneous increase or decrease of cold air from both stacks in response to variations in room temperature.

Figure 3:
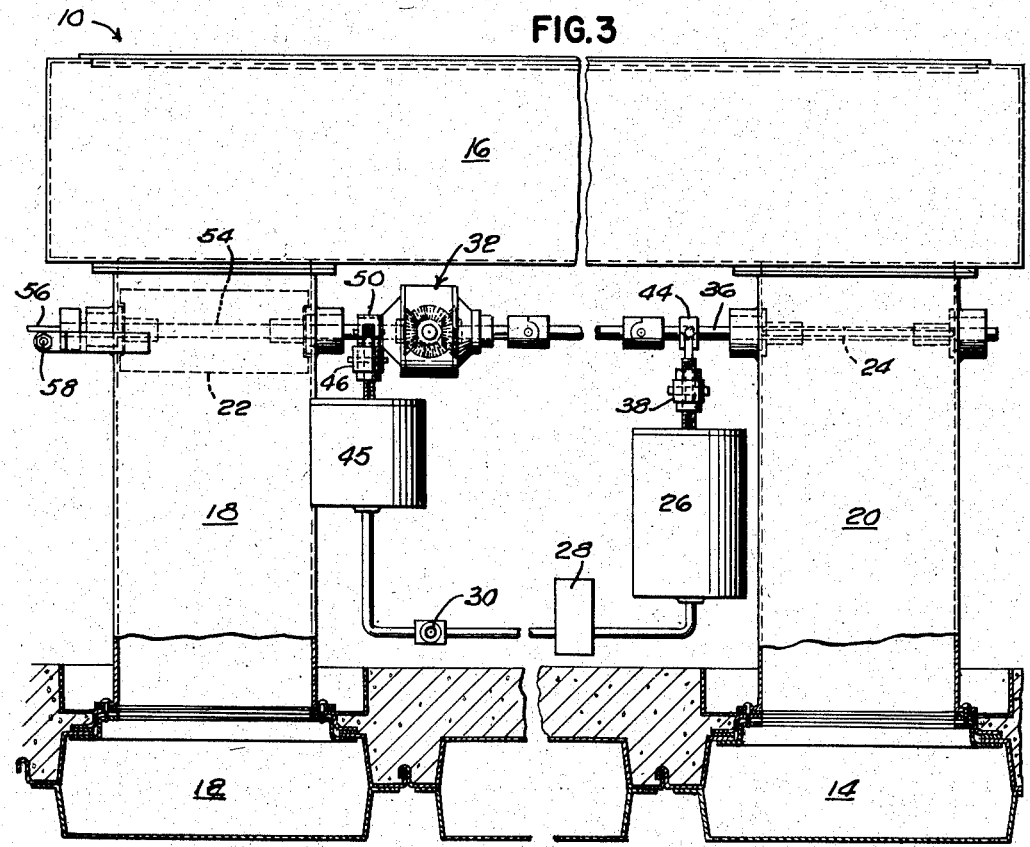
Fig. 3 is a front elevation of the outlet box embodying the present control apparatus.
Figure 2:
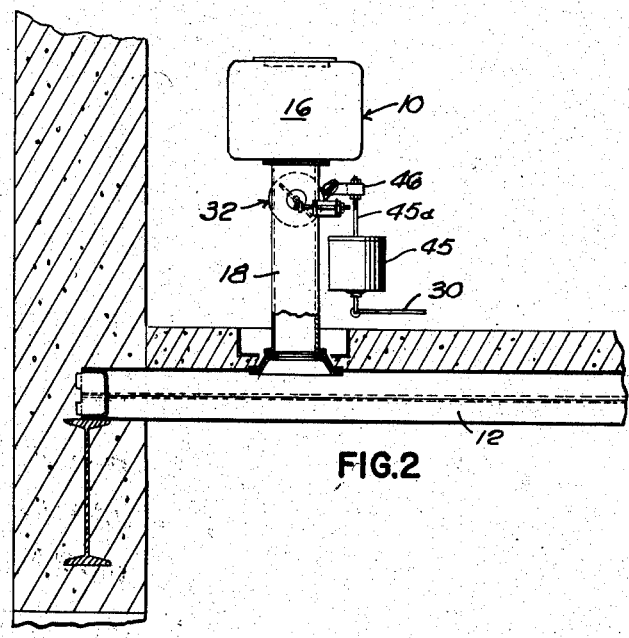
Fig. 2 is a cross sectional view of a portion of the air conditioning system shown in Fig. 1 and illustrating an outlet box embodying the present control apparatus.

The present invention is directed particularly to apparatus for automatically changing the position of one of the dampers through 90° when the seasonal changeover is made so as to arrange both dampers in parallel relation at this time. As shown in Figs. 3 and 4, the dampers 22, 24 are initially arranged at right angles to each other for the winter heating season and are connected through a differential gear device indicated generally at 32. In operation when the operating cylinder piston 25 is moved up in response to an increase in room temperature the right hand damper 24 is rocked from a closed to an open position in a counterclockwise direction, and through the 1 to 1 ratio of the differential gears 33, 34, 35 of the unit 32 the left hand damper 22 is rocked an equal amount from an open to a closed position in a clockwise direction.

As shown in Fig. 5, the connections between the operating cylinder piston 25 and the right hand damper shaft 36 include an arm 38 having a pin 40 which is arranged to cooperate with a slot 42 in an arm 44 fast on the shaft 36, the cylinder 26 being arranged to rock the shaft through 90° from an open to a closed position and from a closed to an open position in response to variations in air pressure as controlled by the thermostat valve 28 in response to variations in room temperature.

During the summer cooling season both air conducting cells 12, 14 are connected to a cold air supply, and in order to rotate the left hand damper 22 through 90° into parallel relation to the right hand damper 24 a second air cylinder or changeover cylinder 45 is connected in the compressed air supply line 30. The changeover cylinder is provided with a piston 45a connected by a similar piston arm 46 to a slotted link 48 resiliently connected to an arm 50 fast on a hub 51 of the differential housing 52. The resilient connection which comprises a spring loaded toggle joint is provided to permit over travel of the linkage, and as shown in detail in Figs. 10 and 11 includes a spring 61 coiled about the pivot pin 60, an extended loop 63 of the spring bearing against the hub of the arm 50, and the ends 65 of the spring extending in the opposite direction bearing against a bottom wall 67 of the link 48. The link 48 is also provided with an extension 69 also arranged to bear against the hub of the arm 50, the extension 69 serving as a stop to limit the rocking movement of the link relative to the arm in this direction, and maintaining the arm and the link in radial alignment as shown in Figs. 6 and 10. However, the link 48 is free to rock upwardly when the arm 50 is held stationary as will be described.

During the winter heating season the compressed air supply in line 30 is maintained at approximately 10 lbs. per square inch pressure, for example, and at such pressure the changeover cylinder 45 is inoperative so that its piston remains in a lowered position and holds the differential unit stationary as shown in Fig. 6. However, during the summer cooling season the air pressure in supply line 30 is substantially increased to about 20 lbs. per square inch, for example, so as to move the changeover piston 45a upwardly and rock the differential housing in a counterclockwise direction. Since the operating cylinder 26 holds the right hand shaft 36 and differential gear 33 stationary at this time, the planetary gear 34 will roll on gear 33 and effect a 2 to 1 ratio rotation of gear 35. Thus, rotation of the differential housing 52 through 45° will effect rotation of the left hand damper shaft 54 and its damper 22 through 90° to dispose the left hand damper 22 parallel to the right hand damper 24 for the summer cooling season. It will be observed that the differential housing 52 is rocked in a counterclockwise direction, viewing Fig. 7, and that the damper 22 is also rocked in a counterclockwise direction, but twice as far as the differential housing 52.

The above description assumes an exact parallel relation between the two dampers and movement of damper 22 through a full 90° for the seasonal changeover which may be preferred for some installations. However, during the summer cooling season it may not be desired to cut off the air entirely from both stacks 18, 20. Instead it may be preferred to hold the damper 22 in a partially open position in order to meet minimum ventilation requirements. For this purpose a crank pin 56 carried by a collar 57 fast on the end of the left hand damper shaft 54 is arranged to cooperate with an adjustable set screw 58 carried by a stationary bracket 59 so as to prevent rotation of the damper 22 through a full 90°. As shown in Fig. 7, the damper 22 may be stopped at about 45°, and since such stopping will also stop rotation of the differential housing, the housing will have been moved through one-half this distance or 22½°. However, the changeover piston 45a is arranged to continue its full stroke, as shown in Fig. 7, the resilient link 48 pivoting at 60 to permit such movement. During subsequent operation of the operating cylinder 26 in response to variations in room temperature, rotation of the right hand shaft 36 in a counterclockwise direction to open the damper 24 will permit the differential housing 52 to be rocked in a counterclockwise direction by gears 33, 34 since the damper shaft 54 and its differential gear 35 are being held in a stopped position, the gear 34 rolling on gear 35. This action continues until the right hand damper is opened to a 45° position corresponding to the position of the left hand damper whereupon the arm 50 will come into alignment with the slotted resilient link 48 as shown in Fig. 8. Thereafter further rotation of the right hand shaft 36 in a counterclockwise opening direction will effect rotation of the left hand shaft 54 and its damper 22 in a clockwise opening direction and will also move the pin 56 away from the set screw 58, the differential housing remaining in its 45° position until subsequent operation of the operating cylinder 26 in the opposite direction again brings the stop elements 56, 58 into operative engagement.

From the above description it will be seen that the right hand air cylinder 26 is the operating cylinder and that during the winter heating season the dampers 22, 24 are set at right angles to each other so that in operation the hot and cold air dampers are modulated against each other to supply different or equal amounts of hot and cold air to be mixed and discharged from the sill box in response to variations in room temperature, the cold and hot air dampers being rotated in opposite directions through the differential drive mechanism 32. During the summer cooling season, when both stacks 18, 20 are supplied with cool air, the main line air pressure is increased to operate the cylinder 45 and, if desired, such operation may effect rotation of the housing 52 through 45° to rotate the damper 22 through 90° in a counterclockwise direction to dispose the left hand damper 22 parallel to the right hand damper 24, the cylinder 45 maintaining the differential housing in its 45° position throughout the summer cooling season so that upon opening or closing of the right hand damper the left hand damper will be simultaneously opened and closed but in opposite directions through the differential unit 32. It will also be observed that, if desired, the stop mechanism may be used to prevent a full 90° rotation of the damper 22 so as to maintain the damper 22 at least partially open to meet the minimum requirements for ventilation purposes, the resiliently mounted arm permitting overtravel of the piston 45a, as shown, to accommodate the stop mechanism.

In practice it will be seen that the present damper control apparatus enables the air conditioning system to be rapidly and efficiently converted from its winter heating cycle of operation to its summer cooling cycle of operation, or vice versa. The changeover from winter to summer operation may be effected in any position of operation or point in the cycle of the dampers 22, 24 existing at the time of the changeover. It will also be apparent that the thermostatically controlled damper motor 26 will continue to respond to the room temperature in the same manner as before the changeover such that the relative openings afforded by the dampers 22, 24 are substantially identical thereafter without causing any overlapping position of the dampers during the changeover or discomfort to the occupants of the room during or after the changeover. The changeover is effected by the differential which effects rotation of one damper in a direction opposite to the other but at the same rate such that the two dampers 22, 24 are arranged parallel to one another, thereby having the same aspect with relation to each other. In this manner the volume of flow of cool air through the stacks to the discharge outlet is balanced.

Figure 13:
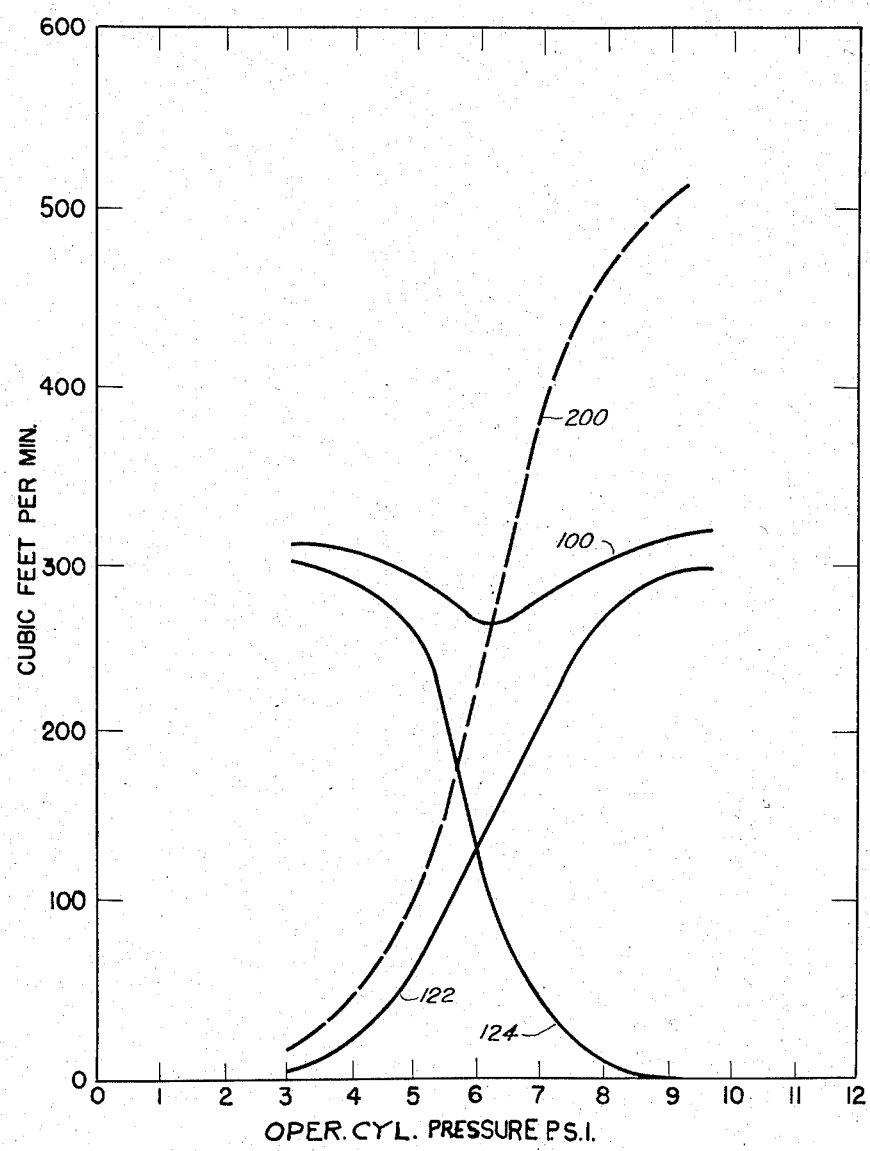
Fig. 13 is a chart graphically illustrating the performance of the dampers.

In order to graphically indicate the performance of the present damper control apparatus reference is made to the chart shown in Fig. 13 wherein the curves 122, 124 indicate the result of opening and closing the dampers 22, 24 during the heating cycle of operation in which the dampers are arranged at right angles to each other, the total heating performance being indicated at 100. During the summer cycle of operation the dampers are arranged in parallel relation to each other with cool air being supplied to both ducts, and it may be observed that the total cooling curve indicated at 200 is uniformly double that obtained during the heating cycle. Thus, it will be apparent that the present damper control apparatus enables the air conditioning system to be rapidly changed over from heating to cooling or vice versa in a rapid and efficient manner.

While the preferred embodiment of the invention has been herein illustrated and described, it will be understood that the invention may be embodied in other forms within the scope of the following claims.

Having thus described the invention, what is claimed is:

1. In a dual duct air conditioning system, an air distributing outlet box having dual inlet ducts adapted for connection to dual air supply ducts, a damper in each inlet duct, said dampers being disposed at right angles to each other under one set of conditions, thermostatistically controlled means for operating said dampers under said one set of conditions to effect closing of one damper while the other damper is opening, changeover means operatively connected to one damper for rotating said one damper through 90° with relation to the other damper under a second set of conditions, said thermostatically controlled means thereafter controlling the operation of the dampers to effect movement of the dampers relative to one another while maintaining the openings identical with each other at all times during the portion of the second set of conditions above the minimum ventilation requirements.

2. In a dual duct air conditioning system, an air distributing outlet box having dual inlet ducts adapted for connection to dual air supply ducts, a damper in each inlet duct, said dampers being disposed at right angles to each other under one set of conditions, thermostatically controlled means for operating said dampers under one set of conditions to effect closing of one damper while the other damper is opening, changeover means operatively connected to one damper for rotating said one damper through 90° with relation to the other damper under a second set of conditions, said thermostatic means thereafter controlling the operation of the dampers to effect movement of the dampers relative to one another while maintaining the openings identical with each other at all times during the second set of conditions.

3. In a dual duct air conditioning system, an air distributing outlet box having dual inlet ducts adapted for connection to dual air supply ducts, a damper in each inlet duct, said dampers being disposed at right angles to each other under one set of conditions, thermostatically controlled means for operating said dampers under one set of conditions to effect closing of one damper while the other damper is opening, changeover means operatively connected to one damper for rotating said one damper through 90° with relation to the other damper under a second set of conditions, said thermostatically controlled means thereafter controlling the operation of the dampers to effect movement of the dampers relative to one another while maintaining the openings identical with each other at all times during at least a portion of the second set of conditions.

4. In a dual duct air conditioning system, an air distributing outlet box having dual inlet ducts adapted for connection to dual air supply ducts, a damper in each inlet duct, said dampers being disposed at right angles to each other under one set of conditions, thermostatically controlled means operatively connected to said dampers for operating said dampers to effect opening of one damper and simultaneous closing of the other damper to modulate the amount of air passed through each of said inlet ducts under said one set of conditions, and thermostatically actuated means operatively connected to one of said dampers for automatically rotating said one damper from a position of 90° with relation to the second damper to a new position with relation to the second damper under a second set of conditions whereby to effect simultaneous opening and closing of both dampers under the influence of said thermostatically controlled means.

5. In a dual duct air conditioning system, an air distributing outlet box having dual inlet ducts adapted for connection to dual air supply ducts, a damper in each inlet duct, said dampers being disposed at right angles to each other under one set of conditions, thermostatically controlled means for operating said dampers to effect opening of one damper and simultaneous closing of the other damper to modulate the amount of air passed through each of said inlet ducts under said one set of conditions, means operatively connected to one of said dampers for automatically rotating said one damper to a position parallel to the other under a second set of conditions whereby to effect simultaneous opening and closing of both dampers under the influence of said thermostatically controlled means, said thermostatically controlled means including an air motor operatively connected to a supply of compressed air and to said dampers, and a thermostatically controlled valve between said supply and said air motor.

6. In a dual duct air conditioning system, an air distributing outlet box having dual inlet ducts adapted for connection to dual air supply ducts, a damper in each inlet duct, said dampers being disposed at right angles to each other under one set of conditions, thermostatically controlled means for operating said dampers to effect opening of one damper and simultaneous closing of the other damper to modulate the amount of air passed through each of said inlet ducts under said one set of conditions, means operatively connected to one of said dampers for automatically rotating said one damper to a position parallel to the other under a second set of conditions whereby to effect simultaneous opening and closing of both dampers under the influence of said thermostatically controlled means, said thermostatically controlled means including an air motor operatively connected to a supply of compressed air and to said dampers, a thermostatically controlled valve between said supply and said air motor, said means for automatically rotating said one damper relative to the other including a differential connection between said dampers, and a second air motor operatively connected to said compressed air supply and to said differential connection and operative upon an increase in pressure in said air supply to rotate the differential to dispose said one damper parallel to the other under said second set of conditions.

7. In a dual duct air conditioning system, an air distributing oulet box having dual inlet ducts adapted for connection to dual air supply ducts, a damper in each inlet duct, said dampers being disposed at right angles to each other under one set of conditions, thermostatically controlled means for operating said dampers to effect opening of one damper and simultaneous closing of the other damper to modulate the amount of air passed through each of said inlet ducts under said one set of conditions, means operatively connected to one of said dampers for automatically rotating said one damper to a position parallel to the other under a second set of conditions whereby to effect simultaneous opening and closing of both dampers under the influence of said thermostatically controlled means, said thermostatically controlled means including an air motor operatively connected to a supply of compressed air and to said dampers, a thermostatically controlled valve between said supply and said air motor, said means for automatically rotating said one damper relative to the other including a differential connection between said dampers, a second air motor operatively connected to said compressed air supply and to said differential connection and operative upon an increase in pressure in said air supply to rotate the differential to dispose said one damper parallel to the other under said second set of conditions, and stop means cooperating with said one damper to prevent complete closing thereof whereby to maintain a predetermined minimum distribution of air under said second set of conditions.

8. A dual duct air conditioning system as defined in claim 7 wherein the connections between said second air motor and said differential connection include resilient linkage to permit overthrow of said linkage when said one damper is engaged by said stop means.

9. A dual duct air conditioning system as defined in claim 4 wherein the dual ducts supply hot and cold air respectively for heating service under said one set of conditions, and wherein both ducts supply cold air for cooling service under said second set of conditions.

References Cited in the file of this patent

UNITED STATES PATENTS

| | | |
|---|---|---|
| 1,015,204 | Murray | Jan. 16, 1912 |
| 2,196,494 | Gibbs | Apr. 9, 1940 |
| 2,727,691 | Alyea | Dec. 20, 1955 |